UNITED STATES PATENT OFFICE.

WILSON WARING, OF SEWAREN, AND JOHN E. BRECKENRIDGE, OF WOODBRIDGE, NEW JERSEY.

PROCESS OF PURIFYING SLUDGE ACIDS.

SPECIFICATION forming part of Letters Patent No. 643,578, dated February 13, 1900.

Application filed April 26, 1899. Serial No. 714,576. (No specimens.)

*To all whom it may concern:*

Be it known that we, WILSON WARING, a resident of Sewaren, and JOHN E. BRECKENRIDGE, a resident of Woodbridge, county of Middlesex, New Jersey, citizens of the United States of America, have invented an Improved Process of Purifying Sulphuric Acid Used in Refining Mineral Oils, of which the following is a specification.

In the process of refining mineral oils sulphuric acid is commonly used, and after the treatment of the oil with such acid the two are separated, certain organic or tarry products being carried off with the acid. The latter so contaminated with the organic or tarry products from the oil is black and so foul that it has been reckoned a waste product, and its odor is so offensive that health boards in neighborhoods where the process has been practiced have condemned its use.

The object of our invention is to so treat this product as to free it from offensive odors and recover the acid for further use by a simple and economical method. For this purpose we treat the acid with nitrate of soda, preferably after the fouled acid has been separated from the refined oil; but, if desired, the acid may be treated with nitrate of soda, while the acid and oil under refinement are still mixed together.

The proportion of nitrate of soda used will vary with the amount of organic or tarry matters contained and also the extent of purification required of the fouled acid. If it is desired only to free the acid from the offensive odors, the amount of the nitrate to be used will be about one per cent., by weight, of the acid to be treated if the amount of contained organic or tarry matters is not too great. If it is desired to separate out the organic or tarry matters and clear the sulphuric acid, a larger proportion of nitrate should be used. For instance, under ordinary conditions of the fouled acid the use of a proportion of about four per cent., by weight, of nitrate to the acid will cause the said organic or tarry matters to rise to the top of the acid and the latter, previously black, will become translucent, free from bad odors, and when separated will be fit for use in many ways not heretofore available.

The nitrate to be mixed with the foul acid is preferably in the form of a solution; but it may be used in solid form, and the acid is slightly stirred after the nitrate is added. The temperature may vary; but it may be observed that too low a temperature—say below 60° Fahrenheit—retards the purification of the fouled acid. On the other hand, if the temperature be too high—say above 180° Fahrenheit—the organic or tarry products may become more of less dissolved and combine with the acid in such a way that while the bad odor will be destroyed the acid will remain black.

We claim as our invention—

The process herein described of purifying sludge acids which have been used in the treatment of mineral oils, consisting of mixing with such acids, at the low temperature described, nitrate of soda in quantity only sufficient to purify the acid, and thereby recovering the acid for further use, substantially as set forth.

In testimony whereof we have signed our names to this specification in the presence of two subscribing witnesses.

WILSON WARING.
    JOHN E. BRECKENRIDGE.

Witnesses:
 CHAS. E. JONES,
 H. V. O. PLATT.